Figure 2:
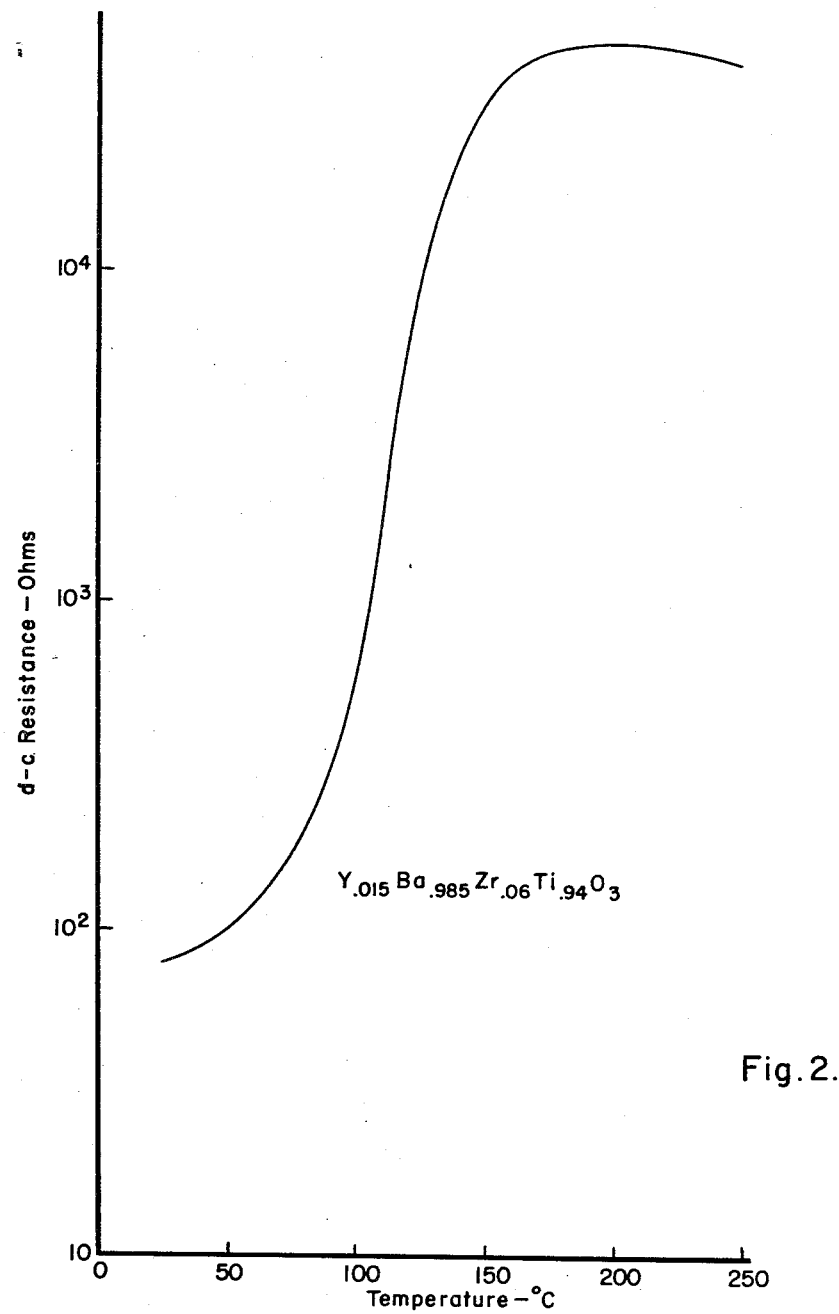

July 17, 1962  YOSHIO ICHIKAWA  3,044,968
POSITIVE TEMPERATURE COEFFICIENT THERMISTOR MATERIALS
Filed May 13, 1958

$Y_{.015} Ba_{.985} Zr_{.06} Ti_{.94} O_3$

Ceramic Body Having Positive Temperature Coefficient of Resistivity

INVENTOR
Yoshio Ichikawa
BY
*Frederick Shaper*
ATTORNEY

United States Patent Office 3,044,968
Patented July 17, 1962

3,044,968
POSITIVE TEMPERATURE COEFFICIENT
THERMISTOR MATERIALS
Yoshio Ichikawa, Swissvale, Pa., assignor to Westinghouse Electric Corporation, East Pittsburgh, Pa., a corporation of Pennsylvania
Filed May 13, 1958, Ser. No. 735,045
5 Claims. (Cl. 252—520)

This invention relates to thermistors comprising ceramic bodies having a high positive temperature coefficient of electrical resistance and processes for preparing them.

Ceramic semiconductor materials are generally known as possessing negative temperature coefficients of resistance, that is, the electrical resistance decreases as the temperature increases. More recently there have been disclosed some materials which have positive temperature coefficients of resistance. However, these materials such as those disclosed in British 714,965 are characterized by only a moderate change in resistance per degree centigrade. In other words, it requires a substantial change in temperature before a marked change in total resistance occurs.

Furthermore, the known materials are characterized by variability of resistivity at any temperature level. In employing such semiconductor materials for temperature control purposes, the variability is so great that individual corrections must be applied to the material in each device employing them.

It would be desirable to have available a material that has a relatively constant predetermined resistivity over a range of temperatures, for example, at room temperature, and then a sudden increase in resistance within a selected range of temperatures and almost abruptly reaches a resistance from 10 to 100 times greater in a matter of a few degrees. The room temperature resistivity should be controllable within rather close limits and the temperature at which the resistance begins to rise abruptly likewise should be readily preselected and controllable with considerable accuracy so that individual calibrations and adjustments are not required for each device employing them.

Thermally sensitive ceramic bodies having a negative coefficient temperature of resistance are commonly called "thermistors." Such thermistors are widely employed in electrical and electronic equipment for measuring temperatures, controlling temperatures, controlling voltage for stabilization of electrical current, for making thermal conductivity measurements and in numerous other applications. A thermistor material with a marked positive temperature coefficient of electrical resistance would be highly desirable for use in electronics and electrical equipment, since it would in many cases increase the accuracy of the devices and simplify their construction. It is particularly desirable that these positive temperature coefficient thermistor materials be characterized by a very abrupt rise in resistance in a range of a few degrees of temperature from a relatively constant low resistance to an extremely high resistance. With such thermistor materials, marked improvement in the electric devices could be made with considerable increase in sensitivity of the devices. Furthermore, much more precise and accurate control could be effected by use of such improved materials.

In my application Serial No. 717,191, filed February 24, 1958, now U.S. Patent No. 2,976,505, I have disclosed thermistors which have excellent positive temperature coefficients of electrical resistance and further may be so proportioned that the low temperature resistance values may be selected as desired. However, these compositions do not have the latitude which enabled the attaining of a desired electrical resistance at a selected temperature, for example, at 100° C. combined with a predetermined lower resistance value at room temperature. The present invention provides this necessary latitude for preparing thermistor compositions which not only have a predetermined room temperature resistance but also have a predetermined resistance at a selected temperature above room temperature, for example 100° C. The differences over the earlier patent application as well as the advantages of the present invention will become more apparent hereinafter.

In producing electrical control devices, it is desirable for some purposes that thermistors associated therewith exhibit a specified low resistance at room temperature, a moderately higher resistance at a selected intermediate temperature, for example at 100° C. to 125° C. and a very high resistance of the order of 10,000 ohms at some elevated temperature above such intermediate temperature. Furthermore, the positive temperature coefficient of resistance should be as great as is possible over a critical temperature range beginning at or about this selected intermediate temperature.

The object of the present invention is to provide new thermistor materials having characteristics such that at low temperatures the electrical resistivity is substantially constant and upon reaching a predetermined temperature, the electrical resistance increases abruptly so that in a range of a few degrees the electrical resistance will increase many times to a high value.

Another object of the invention is to prepare ceramic bodies having a marked positive temperature coefficient of electrical resistivity over a selected narrow range of temperatures, the body comprising a stoichiometric combination of a mixture of titanium dioxide and zirconium oxide, and one of the group consisting of barium oxide, barium strontium oxide and barium lead oxides with controlled small amounts of rare earth metal oxides in order to produce a predetermined low temperature resistivity.

A still further object of the invention is to provide a process for preparing certain barium zirconium titanate ceramic bodies so that the member will exhibit a marked positive temperature coefficient of resistivity within a relatively narrow range of temperatures.

Other objects of the invention will in part be obvious and will in part appear hereinafter.

Figure 1:
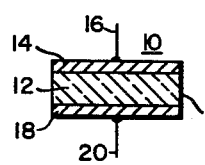

For a better understanding of the nature and scope of the invention, reference should be had to the following, in which:

FIGURE 1 is a view in elevation of a resistance member in accordance with the invention; and FIG. 2 is a graph plotting resistance of a body of a generic composition in accordance with this invention against temperature.

In accordance with the present invention, it has been discovered that thermistor materials having exceptionally controllable resistances at any selected temperature may be prepared by combining certain ceramic forming components composed essentially of (A) 1 mol of a mixture of titanium dioxide and zirconium oxide in proportions providing from 1 mol percent to 25 mol percent of zirconium and from 99 mol percent to 75 mol percent of titanium and (B) a total of 1 mol of a mixture comprising (a) up to 0.997 mol of barium oxide or a barium oxide engendering barium salt and (b) at least one metal oxide selected from the group consisting of yttrium and cerium in proportions of from 0.003 to 0.03 mol. These components are intimately and homogeneously combined and fired in accordance with a schedule to be set forth hereinafter to produce a fired ceramic body which will not only exhibit (1) a predetermined electrical resistance at a selected temperature, but (2) below this temperature will exhibit a relatively low electrical resistance while above this selected temperature will rapidly increase in resistance in a matter of only a few degrees to an extremely high electrical resistance. At the selected temperature where a given electrical resistance is desired, the thermistor materials of the present invention will have a positive temperature coefficient of resistance of an unusually high value so that in a matter of some 25° C. the resistance will rise from a value of, for example, 1000 ohms to several tens of thousands ohms.

In accordance with the present invention, there are produced members of a diameter of 0.375 inch and a length of 0.062 inch whose low temperature or room temperature resistance may be less than 1000 ohms and preferably in the range of from 10 to several hundred ohms while at intermediate temperatures of the order of 100° C. to 125° C., the resistance be of the order of 10 to 50 times that at room temperature along with a large positive temperature coefficient factor at or immediately above said intermediate temperature so that in a matter of 25° C. to 50° C. the resistance reaches a value of well over 10,000 ohms. Hereinafter members having the dimensions of 0.375 inch diameter by 0.062 inch length are specifically considered when reference is made to the electrical resistance thereof.

The ceramic thermistor compositions of the present invention comprise stoichiometric proportions of (A) a mixture of titanium dioxide and zirconium oxide in which the zirconium comprises from 1 to 25 mol percent of the mixture and (B) an oxide from the group consisting of barium oxide and compounds engendering barium oxide when fired, admixed with a small but critical proportion of yttrium oxide or cerium oxide. The following general formula comprises the compositions of the present invention:

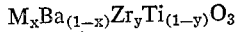

where M represents at least one rare earth metal from the group consisting of yttrium and cerium, $x$ has a value of from 0.003 to 0.03, and $y$ has a value of from 0.01 to 0.25.

More specifically, unusually good results have been had with a composition prepared in accordance with the following formula embodying yttrium:

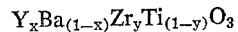

where $x$ has a value of from 0.005 to 0.02 and $y$ has a value of from 0.01 to 0.25.

In preparing the thermistors of the present invention, the titanium dioxide will ordinarily be employed as such, the anatase being the preferred form thereof. The barium oxide may be introduced as barium oxide or barium carbonate. The yttrium oxide or cerium oxide may be added as the oxide, though the nitrate or oxalate salts thereof have given good results in practice. The zirconium oxide may be added as the monoclinic oxide or as zirconium chloride. The compounds are preferably of a highly purified form and should contain less than 1% of non-volatile impurities. It will be appreciated that other compounds capable of producing the required oxides when heated may be employed in lieu of that set forth.

The correct proportions of the titanium dioxide, zirconium oxide, barium oxide or barium carbonate in the yttrium nitrate, for example, are wet mixed with water in a porcelain ball mill using flint pebbles. Ball milling times of 2 to 6 hours have given an intimate homogeneous mixture. The resultant mixture is dried, for example heating to 80° C. and the resultant mud is then calcined in air at 1000° C. for 2 hours. The calcining may be carried out in a refractory crucible, for example one made out of zirconia or zircon. It will be understood that the calcining may be carried out for a shorter period of time of for example, 30 minutes or for longer periods of times of up to a day. The temperature given is not critical but may be varied from 900° C. to 1200° C.

The calcined product is then ball milled in water in a porcelain ball mill, employing flint pebbles, for a period of time of up to 16 hours. The resulting fine suspension is then dried completely and recrushed to pass through a 200 mesh sieve. The resultant powder may be admixed with a small amount of an organic binder such, for example, as a dilute solution of polyvinyl alcohol or some other water soluble organic binder, following the pracitces known in the ceramic industry. The organic binder enables the powder to be compacted in a pellet forming machine to a size and shape necessary for the thermistor body. Good results have been obtained when pressures of from about 5000 to 50,000 pounds per square inch were applied to the oxide powder.

The pressed pellets are sintered in an inert atmosphere, for example argon gas, at a temperature of from 1300° C. to 1550° C. while being supported from a zirconia refractory plate. Thereafter the sintered bodies are heat treated in an oxidizing atmosphere such as air, at a temperature of from 1000° C. to 1300° C. for 1 hour or longer. The sintering in air is critical in imparting desired resistance temperature characteristics to the thermistor members of the present invention. It will be appreciated that the sintering in the inert gas and the subsequent aging in air, may be carried out in the same furnace by replacing the argon, for example, with a flow of air or oxygen, after the initial heating from 1300° C. to 1550° C.

The sintered and air heat treated bodies are then treated to apply to spaced portions thereof electrical contacts. An ultrasonic process employing a solder comprising indium, lead and silver, for example, 10% indium, 10% silver and 80% lead is satisfactory. Electrical leads may then be soldered to the contacts so applied.

Referring to FIG. 1 of the drawings, there is shown a thermistor device 10 which comprises a ceramic body 12 prepared as disclosed herein, of the vitrified and aged ceramic composition of this invention. To the upper face of the body 12 is affixed a contact layer 14 composed of a suitable metal or alloy or other good electrical conducting material into ohmic contact with the body 12. It will be understood that the layer 12 may be applied by soldering, brazing or other suitable techniques providing, however, that there be a very low resistance between the surfaces of the body 12 and the layer 14. A suitable electrical lead 16 is affixed to the layer 14. Similarly, a counterelectrode 18 is affixed to the lower surface of the body 12 and carries an electrical lead 20. It will be understood that the shape and dimensions of the ceramic body 12 will be dependent of the application, the desired ohmic resistance and the like. For many applications the body 12 will be a circular cylinder.

The position of the intermediate temperature resistance of the order of 1000 ohms for an 0.375 inch diameter by 0.062 inch long member is readily controlled by varying the zirconium oxide to the titanium dioxide ratio, as the proportion of zirconium oxide increases from 1 to 25 mol percent, the titanium dioxide decreasing from 99 to 75 mol percent, the thousand ohm resistance point decreases from about 120° C. to 15° C.

The following examples illustrate the practice of the invention.

Example I

Titanium dioxide and zirconium dioxide were admixed in mol proportions of 0.94 and 0.06, respectively. To this mixture was then added .985 mol of barium carbonate and 0.015 mol of yttrium nitrate. These ingredients were wet mixed in water in a porcelain ball mill for 4 hours. The resulting slurry was allowed to settle and the supernatant water was evaporated and the resulting mud was then dried at 80° C. in air. The dry powder so produced was placed in a zirconia crucible and heated in a furnace while exposed to the atmosphere for 2 hours at a temperature of 1000° C. The resulting calcine product was then placed in the porcelain ball mill and was wet milled in water using flint pebbles for 8 hours. The resulting slurry was dried at 80° C. and the resulting dry product was then pulverized mechanically and screened through a 200-mesh sieve. The screen powder was admixed with an emulsion of polyvinyl alcohol in the proportion of 100 grams of the powder to 20 cc. of a 10% aqueous emulsion of the polyvinyl alcohol. The powder mixture was then pressed at a pressure of 15,000 p.s.i. into a cylindrical pellet. The pellet was sintered in an argon atmosphere at 1350° C. for 2 hours while supported on a zirconia plate. The resulting vitrified cylinder was then placed within a furnace in which air circulated and was heat treated in the air at 1250° C. for 2 hours.

The resulting sintered cylindrical body of 0.375 inch diameter and 0.062 inch long, was then coated at both ends of the cylinder with an alloy of indium, lead and silver applied ultrasonically at a temperature of 310° C. Electrodes were then soldered to the solder layer so applied at each end of the cylinder.

The resistance characteristics of the resulting thermistor element were determined over a range of temperatures and the curve of FIG. 2 of the drawing was plotted from this test. It will be noted that at 100° C. the resistance was approximately 620 ohms. At room temperature the resistance was 80 ohms. It will be observed that at 100° C. the positive temperature coefficient is extremely high so that in a temperature interval of less than 10° C. the resistance tripled. The maximum resistance, obtained at approximately 180° C., was 50,000 ohms.

Example II

Fired ceramic thermistor pellets were prepared by following the process of Example I, with the components being proportioned to provide a composition having the formula:

$$Y_{0.015}Ba_{0.985}Zr_{0.20}Ti_{0.80}O_3$$

The average values of the electrical resistance properties at room temperature for pellets 0.375 inch in diameter and 0.062 inch in length were 30 to 40 ohms, while the pellets had a resistance of 1000 ohms at 45° C. The positive temperature coefficient at 45° C. was large so that in the succeeding 25° C. the resistance was over 10,000 ohms.

Example III

Fired ceramic thermistor pellets were prepared by following the process of Example I, the components being proportioned to provide a composition of the following formula:

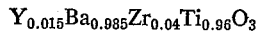

$$Y_{0.015}Ba_{0.985}Zr_{0.04}Ti_{0.96}O_3$$

The average electrical resistance at room temperature was from 30 to 40 ohms, while at 115° C. the resistance was 1000 ohms. At 150° C. the electrical resistance was over 30,000 ohms.

Example IV

The process of Example I was followed, substituting cerium nitrate for the yttrium, and the final fired pellets had a composition of the formula:

$$Ce_{0.01}Ba_{0.99}Zr_{0.06}Ti_{0.94}O_3$$

The average electrical resistance of the pellets of this example at 25° C. was from 40 to 60 ohms, while at 100° C. it was 700 ohms. The positive temperature coefficient at 100° C. was so large that at 175° C. the resistance was in excess of 10,000 ohms.

By following the procedure of Example I, pellets can be prepared from mixtures of cerium and yttrium salts, to produce compositions having the formula:

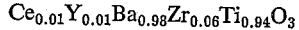

$$Ce_{0.01}Y_{0.01}Ba_{0.98}Zr_{0.06}Ti_{0.94}O_3$$

In each of the examples, the pellets of this invention were prepared in large batches, usually several hundred and the tests were made on groups of from 20 to 40. The individual pellets were of surprisingly uniform electrical resistance at, for example, 100° C., varying very slightly, though at room temperature (25° C.) the resistance values had more spread often varying in the range of from 20 to 60 ohms. The electrical resistance was determined by employing a direct current of 5 milliamperes.

It will be understood that the present specification and drawing are only illustrative and not limiting.

I claim as my invention:

1. A ceramic member having a marked positive temperature coefficient of electrical resistance over a selected range of temperatures, the member comprising the fired product having the general formula

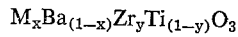

$$M_xBa_{(1-x)}Zr_yTi_{(1-y)}O_3$$

where M represents at least one rare earth metal from the group consisting of yttrium and cerium, $x$ has a value of from 0.003 to 0.03, and $y$ has a value of from 0.01 to 0.25, the fired product being derived by a final heat treatment of compacts of the composition first in an inert, non-oxidizing atmosphere at from 1300° C. to 1550° C. to sinter it and then at a temperature of from 1000° C. to 1300° C. in an oxidizing atmosphere comprising oxygen.

2. A ceramic member having a marked positive temperature coefficient of electrical resistance over a selected range of temperatures, the member comprising the fired product having the general formula

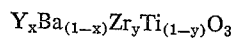

$$Y_xBa_{(1-x)}Zr_yTi_{(1-y)}O_3$$

where $x$ has a value of from 0.005 to 0.02 and $y$ has a value of from 0.01 to 0.25, the fired product being derived by a final heat treatment of compacts of the composition first in an inert, non-oxidizing atmosphere at from 1300° C. to 1550° C. to sinter it and then at a temperature of from 1000° C. to 1300° C. in an oxidizing atmosphere comprising oxygen.

3. A thermistor comprising a fired member having the general formula

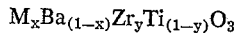

$$M_xBa_{(1-x)}Zr_yTi_{(1-y)}O_3$$

where M represents at least one rare earth metal from the group consisting of yttrium and cerium, $x$ has a value of from 0.003 to 0.03, and $y$ has a value of from 0.01 to 0.25, the fired product being derived by a final heat treatment of compacts of the composition first in an inert, non-oxidizing atmosphere at from 1300° C. to 1500° C. to sinter it and then at a temperature of from 1000° C. to 1300° C. in an oxidizing atmosphere comprising oxygen.

4. A thermistor comprising a fired member having the formula

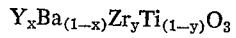

$$Y_xBa_{(1-x)}Zr_yTi_{(1-y)}O_3$$

where $x$ has a value of from 0.005 to 0.02 and $y$ has a value of from 0.01 to 0.25, the fired product being derived by a final heat treatment of compacts of the composition first in an inert, non-oxidizing atmosphere at from 1300° C. to 1550° C. to sinter it and then at a temperature of from 1000° C. to 1300° C. in an oxidizing atmosphere comprising oxygen.

5. In the process of producing a positive temperature coefficient thermistor member, the steps comprising initially admixing compounds of zirconium, titanium, barium and at least one rare earth metal of the group consisting of yttrium and cerium which compounds on being fired above about 900° C. produce the oxides thereof, the compounds being admixed in proportions to correspond to the following general formula when so fired:

$$M_xBa_{(1-x)}Zr_yTi_{(1-y)}O_3$$

where M represents at least one rare earth metal from the group consisting of yttrium and cerium, $x$ has a value of from 0.003 to 0.03, and $y$ has a value of from 0.01 to 0.25, firing the intimate admixture at a temperature of from about 900° C. to 1200° C., finely dividing the fired product, compacting the resulting powder under pressure into bodies of selected size and shape, firing the compacts into a sintered body at a temperature of from 1300° C. to 1550° C. in an inert non-oxidizing atmosphere, and finally heating the bodies in an oxidizing atmosphere at a temperature of from 1000° C. to 1300° C. for at least about one hour.

References Cited in the file of this patent
UNITED STATES PATENTS

| | | |
|---|---|---|
| 2,398,088 | Ehlers et al. | Apr. 9, 1946 |
| 2,432,250 | Rath | Dec. 9, 1947 |
| 2,434,236 | Johannes et al. | Jan. 6, 1948 |
| 2,616,813 | Klasens | Nov. 4, 1952 |
| 2,689,186 | Day | Sept. 14, 1954 |
| 2,776,898 | Day et al. | Jan. 8, 1957 |

FOREIGN PATENTS

| | | |
|---|---|---|
| 714,965 | Great Britain | Sept. 8, 1954 |
| 780,735 | Great Britain | Aug. 7, 1957 |